Figure 1A:
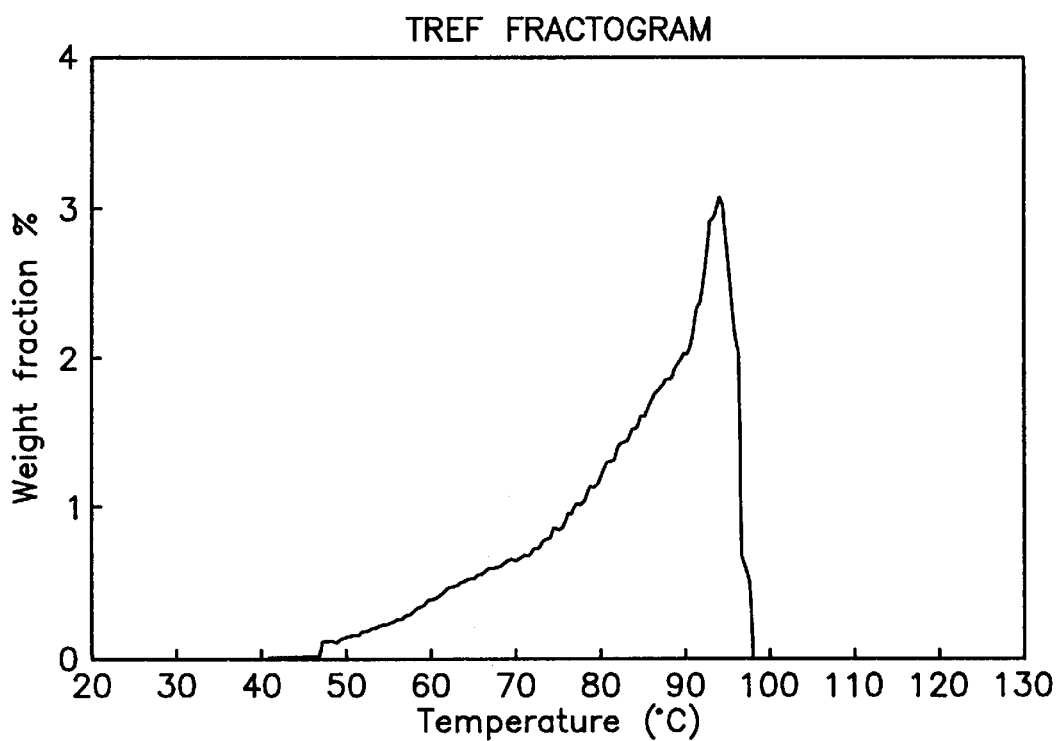
Figure 1B:
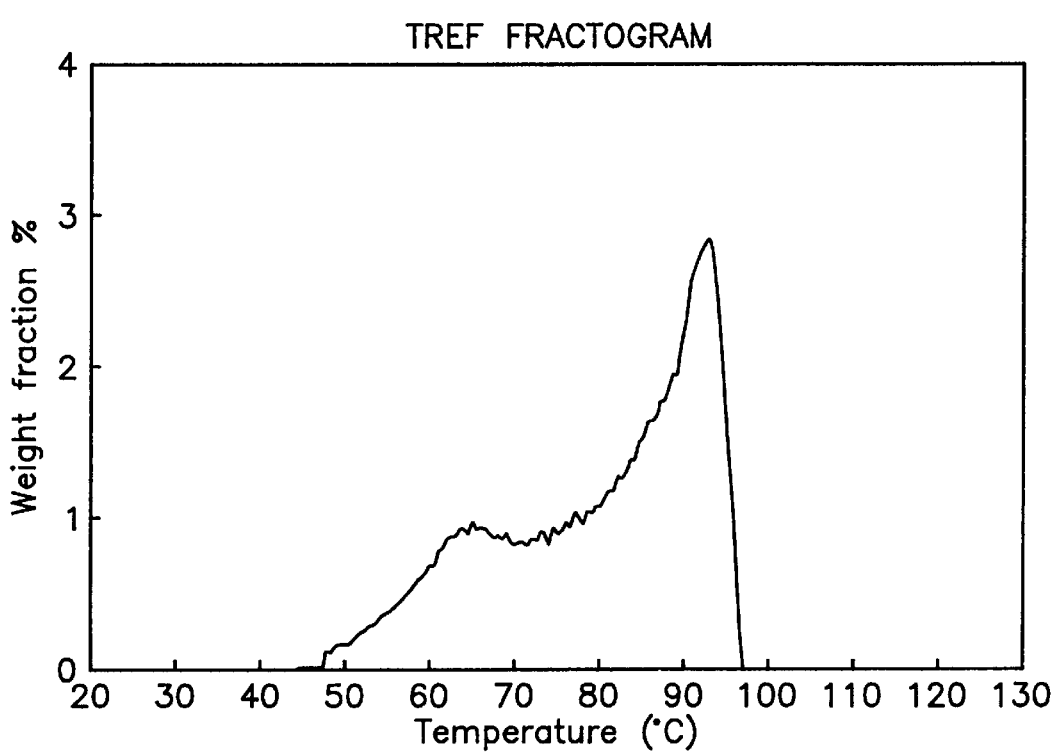
Figure 1C:
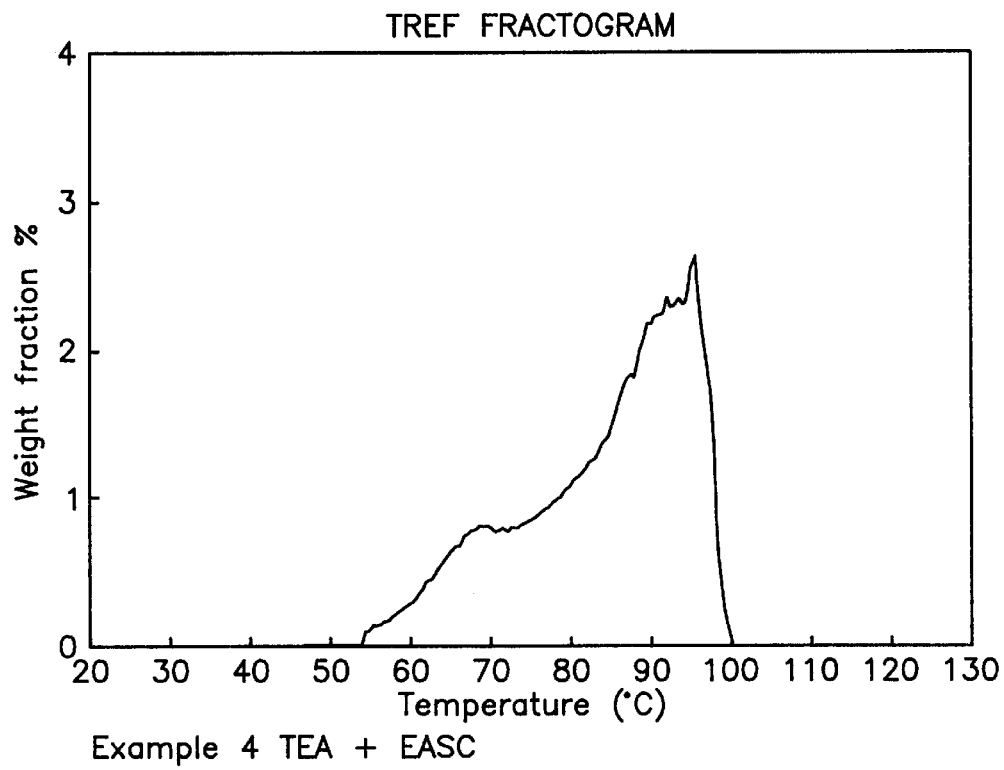
Figure 1D:
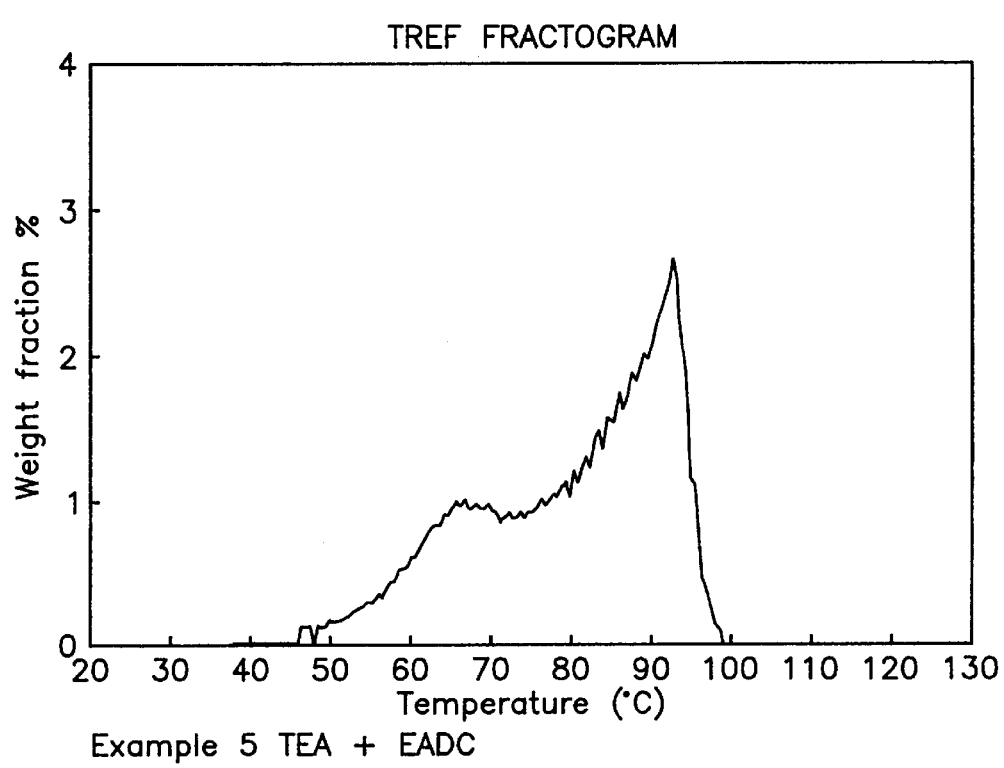

United States Patent [19]
Sillantaka et al.

[11] Patent Number: 6,043,326
[45] Date of Patent: *Mar. 28, 2000

[54] PROCESS FOR COPOLYMERIZING ETHENE AND ALPHA-OLEFINS

[75] Inventors: Leona Sillantaka, Helsinki; Ulf Palmqvist; Eero Iiskola, both of Porvoo; Susanna Koivujärvi, Tuusula, all of Finland

[73] Assignee: Borealis Polymers Oy, Porvoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/716,298

[22] PCT Filed: Mar. 23, 1995

[86] PCT No.: PCT/FI95/00152

§ 371 Date: Nov. 26, 1996

§ 102(e) Date: Nov. 26, 1996

[87] PCT Pub. No.: WO95/25758

PCT Pub. Date: Sep. 28, 1995

[30] Foreign Application Priority Data

Mar. 24, 1994 [FI] Finland ..................... 941369

[51] Int. Cl.[7] ..................... C08F 4/44

[52] U.S. Cl. ............ 526/153; 526/124.5; 526/124.6; 526/124.7; 526/124.8

[58] Field of Search ............... 526/153, 124.5, 526/124.6, 124.7, 124.8

[56] References Cited

U.S. PATENT DOCUMENTS

| | | | |
|---|---|---|---|
| 3,118,865 | 1/1964 | Bruce et al. | 526/153 |
| 3,172,881 | 3/1965 | Farrar et al. | 526/153 |
| 3,182,051 | 5/1965 | Marullo et al. | 526/153 |
| 3,281,375 | 10/1966 | Vandenberg | 526/153 |
| 4,093,789 | 6/1978 | Kuroda et al. | 526/124.7 |
| 4,115,319 | 9/1978 | Scata et al. | 526/125.2 |
| 4,258,161 | 3/1981 | Kakogawa et al. | |
| 4,349,648 | 9/1982 | Jorgensen et al. | |
| 4,354,009 | 10/1982 | Goeke et al. | 526/124.6 |
| 4,418,184 | 11/1983 | Ueda et al. | 526/124.7 |
| 4,442,276 | 4/1984 | Kashiwa et al. | 526/124.8 |
| 4,549,001 | 10/1985 | Martin | |
| 4,634,687 | 1/1987 | Fujita et al. | |
| 4,647,633 | 3/1987 | Kostelnik | |
| 4,736,002 | 4/1988 | Allen et al. | 526/153 |
| 5,118,769 | 6/1992 | Kondo et al. | 526/124.7 |
| 5,139,986 | 8/1992 | Cook et al. | |

FOREIGN PATENT DOCUMENTS

| | | |
|---|---|---|
| 0022675 | 1/1981 | European Pat. Off. |
| 0193245 | 9/1986 | European Pat. Off. |
| 341091 | 11/1989 | European Pat. Off. |
| 435557 | 7/1991 | European Pat. Off. |
| 58-127710 | 7/1983 | Japan ................. 526/153 |
| 1367087 | 9/1974 | United Kingdom |

*Primary Examiner*—David W. Wu
*Assistant Examiner*—Ling-Siu Choi
*Attorney, Agent, or Firm*—Birch, Stewart, Kolasch & Birch, LLP

[57] ABSTRACT

Ethene having a profitable α-olefin distribution and an α-olefin copolymer have been prepared with a process comprising reacting of at least the following components with each other:

a) a procatalyst comprising a halogen compound of a transition metal in any of groups 4 to 8 of the periodic table of elements, b) a cocatalyst comprising an organohalogenous compound of a metal in group 2 or 3 of the periodic table of elements, c) ethene and d) one or more α-olefins copolymerizing with ethene, being characterised in that the organohalogenous compound of the metal in group 2 or 3 is prepared by reacting the organic compound of the metal in group 2 or 3 and a catalytically non-toxic halogen compound during copolymerization, or not earlier than 3 hours before copolymerization.

16 Claims, 11 Drawing Sheets

Example 1 (Comparative example) TEA

Example 2 (Comparative example) DEAC

Example 4 TEA + EASC

Example 5 TEA + EADC

Example 6

Example 7

Example 8

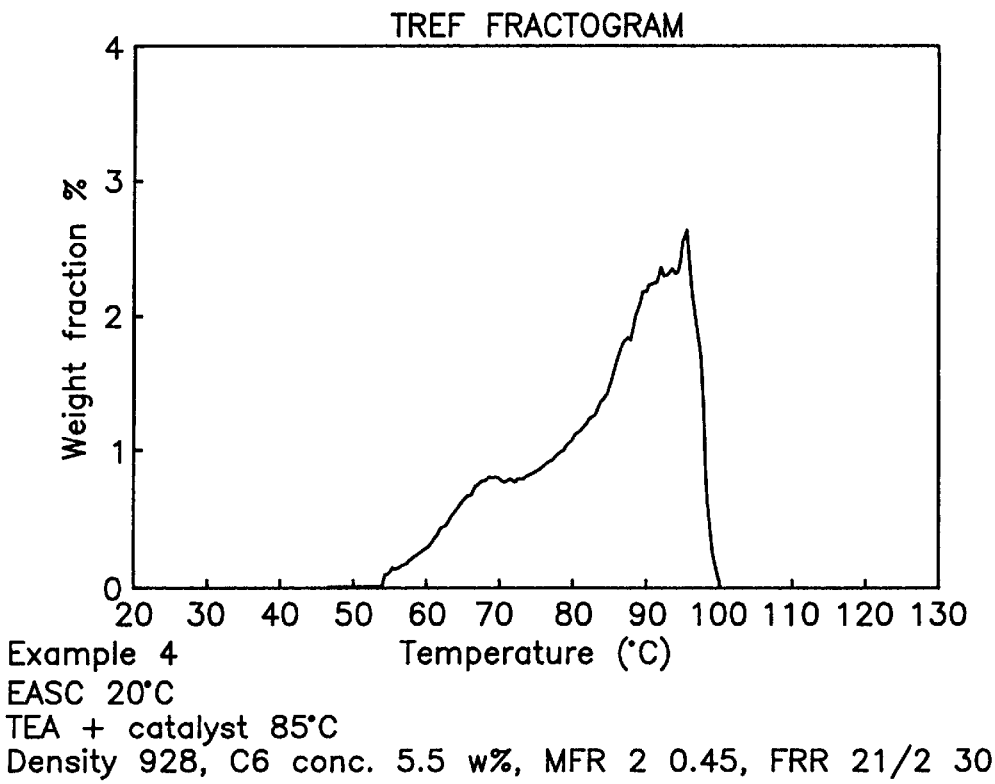
Example 4
EASC 20°C
TEA + catalyst 85°C
Density 928, C6 conc. 5.5 w%, MFR 2 0.45, FRR 21/2 30.4
FIG.6A
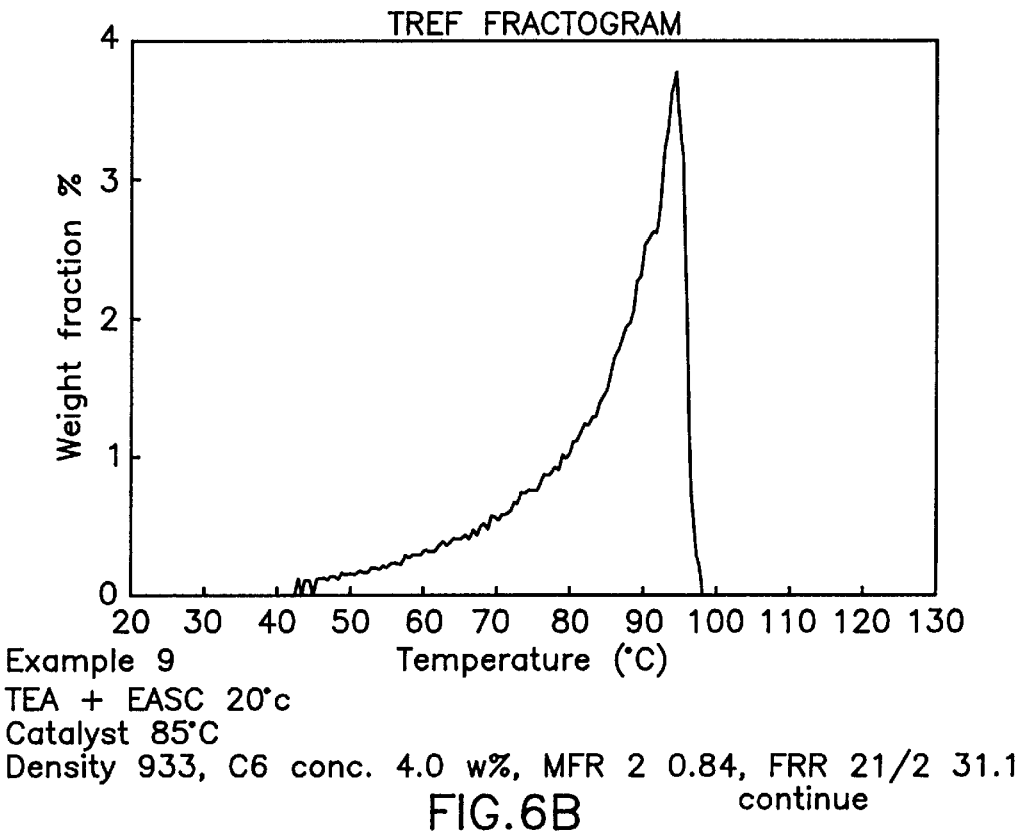
Example 9
TEA + EASC 20°c
Catalyst 85°C
Density 933, C6 conc. 4.0 w%, MFR 2 0.84, FRR 21/2 31.1
FIG.6B continue Example 10
TEA + EASC 85°C
Catalyst 85°C
Density 933
C6 conc. 3.4 w%
MFR 2 0.49
FRR 21/2 30.6

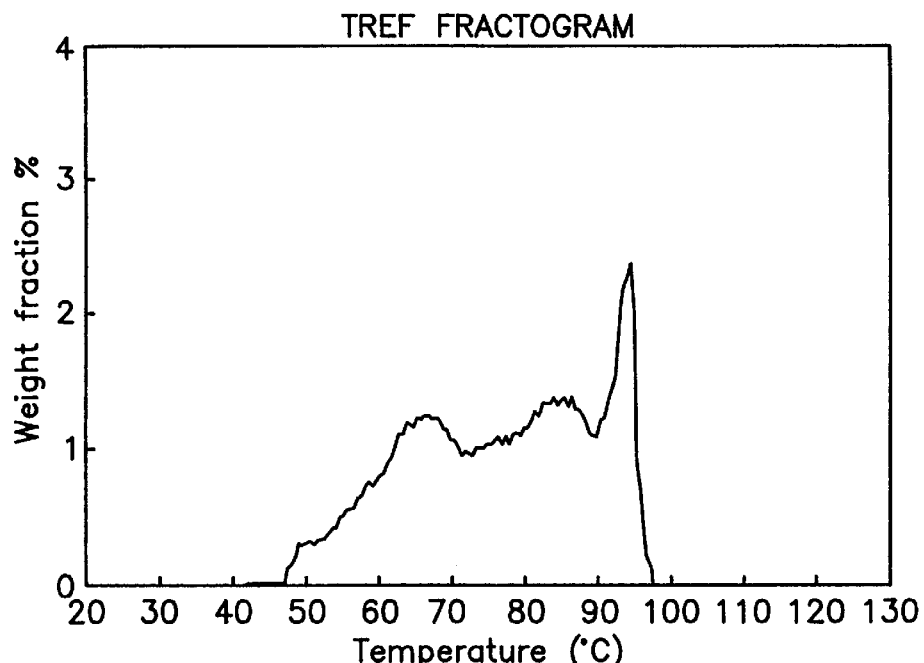
Example 12 (comparative example)
TEA 20°C, Catalyst 85°C
Density 922, C6 conc. 10.0 w%, MFR 2 4.86, FRR 21/2 28.1
FIG.8A
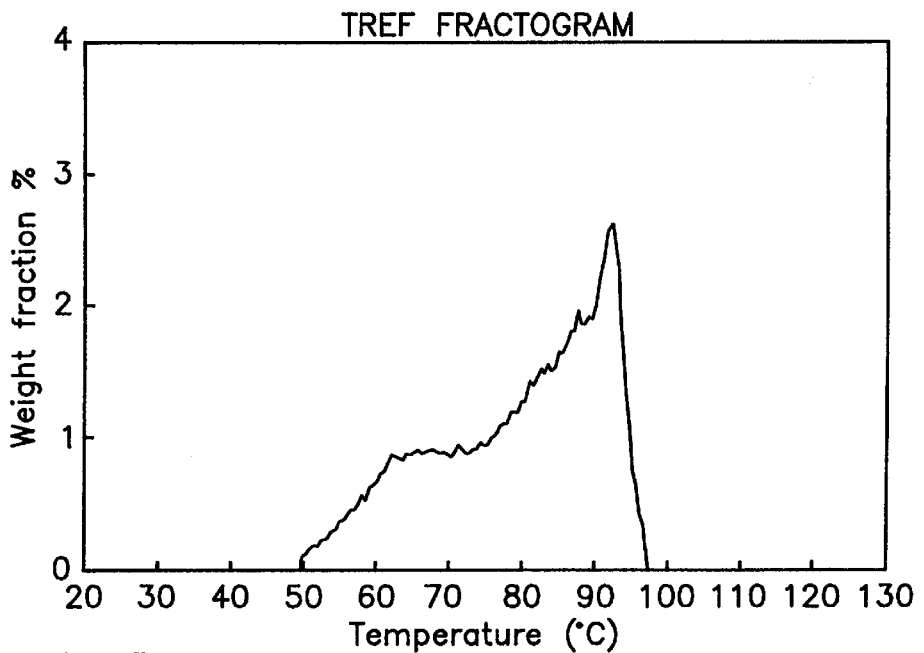
Example 13
TEA + EASC 20°C, Catalyst 85°C
Density 926, C6 conc. 6.9 w%, MFR 2 0.96, FRR 21/2 25.2
FIG.8B    continue

PROCESS FOR COPOLYMERIZING ETHENE AND ALPHA-OLEFINS

The invention relates to a process for copolymerizing ethene and α-olefins comprising reacting at least the following components with each other:

a) a procatalyst comprising a halogen compound of a transition metal in any of groups 4 to 8 of the periodic table of elements, b) a cocatalyst comprising an organohalogenous compound of a metal in group 2 or 3 of the periodic table of elements, c) ethene and d) one or more α-olefins copolymerizing with ethene.

The invention also relates to a catalyst composition for polymerizing olefinic compounds consisting of at least the following components:

a) a procatalyst comprising a halogen compound of a transition metal in any of groups 4 to 8 of the periodic table of elements, b) a cocatalyst comprising an organohalogenous compound of a metal in group 2 or 3 in the periodic table of elements.

The Ziegler-Natta catalyst system, comprising a "procatalyst" and a "cocatalyst", is generally used for olefin polymerization. A procatalyst is a component based on a transition metal compound in any of groups 4 to 8 of the periodic table of elements (Hubbard, IUPAC 1970). A cocatalyst is a component based on an organometallic compound in any of groups 1 to 3 of the periodic table of elements. Conventional catalytic systems usually also comprise carriers, electron donor compounds and other adjuvants enhancing and modifying catalytic properties.

Currently hundreds of different polyethene qualities are available, most of them having qualitative or other mutual differences. Qualitative differences may be due to the following facts:

a) different short-chain branching degree of the polymer, b) different long-chain branching degree of the polymer, c) different average molecular weight of the polymers, d) different molecular weight distribution of the polymer, which may be partly due to long-chained branches, e) presence of minor comonomer residues and f) presence of minor impurities and polymer residues in the polymer, some of them risking to be associated with the polymer.

Branching in high-pressure, i.e. low-density polyethene appeared for the first time as polymers were found to contain 20 to 30 methyl groups per 1,000 carbon atoms by means of an IR spectrometer. It ultimately transpired that methyl groups are due to ethyl and butyl secondary groups, formed as the point of growth shifts somewhat backwards in the chain being generated (Back-biting).

However, such short-chained branches do not appear to any notable degree in homopolymers prepared with co-ordinating catalysts.

The appearance of branching in ethene polymers has a significant impact on the crystallisation of polymers, being subsequently reflected in the properties of the polymer. Branched low-density polyethenes (LDPE) have low density (due to high atom crystallisation packing density reduced by branches), low opacity (given that large reflective crystal agglomerations are hampered) and a low melting point yield limit, surface hardness and Young index (all these properties depending on the crystallisation degree). Moreover, with higher branching and lower crystallisation, gas and vapour permeability of the polyethene will be higher. For technical purposes, polyethene density has been chosen as a measure of short branching appearing in polymers.

Alongside short branches, a number of long branches appear in LDPE polymer per polymer molecule. These side chains may be of the same length as the original main chain, resulting in a broad chain length distribution in the same manner as the main chain. Long side chains affect the viscosity of LDPE polymers. Unbranched polymers have higher melt viscosities than long-chained polymers with the same average molecular weight. This is in fact to be expected, because long-chained molecules are more solid, and are not as easily twisted around other molecules as linear polymers.

Lately linear low-density polyethene qualities, called LLDPE qualities, have been developed, being practically totally without long-chained branches, but containing short side chains produced by copolymerization of ethene and a minor amount of α-olefins (α-olefin, e.g. 1-hexene, 1-octene and similar). This type of branching hampers polymer crystallisation in the same way as in former LDPE qualities, yielding a low-density product in the way they did. In this conjunction "linear" implies absence of long chains, not short chains.

In the copolymerization of ethene with longer α-olefins, the comonomers mentioned above tend to be irregularly distributed over the molecule chains. The concrete result of polymerization is a mixture containing polyethene qualities with various densities. In heat-fractioning by means of a TREF analyser, high-density (HDPE), linear low-density (LLDPE) and very low-density (VLDPE) polyethene are distinguished in the product, particularly if 1-hexene or higher alkenes are being used as an α-olefin.

One can expect that, if the comonomer distribution in LLDPE polymer chains were more regular, a film made of LLDPE would have better mechanical and optical characteristics. A second problem consists in the low comonomer sensitivity provided by the catalyst, i.e. a poor tendency to incorporate the catalyst in the molecule chain.

U.S. Pat. No. 4,833,111 describes an α-olefin on a carrier, and specifically an LLDPE polymerization catalyst composition, prepared by contacting the carrier with dialkyl magnesium, by contacting the first reaction product with alcohol, by reacting the second reaction product thus obtained with a soluble transition metal compound, by contacting the third reaction product obtained with a halogenated alkyl aluminium compound, and by eventually associating the fourth reaction product with trimethyl aluminium. In the preparation of LLDPE, the catalyst composition is very sensitive to higher ($C_3$–$C_{10}$)-α-olefins acting as a comonomer. The specification does not mention the distribution of higher α-olefins vis-a-vis macromolecules.

U.S. Pat. No. 4,954,470 discloses an α-olefin and more specifically an LLDPE polymerization catalyst composition on a carrier, prepared by contacting the carrier with dialkylmagnesium, by contacting the first reaction product obtained with chlorinated alcohol, by contacting the second reaction product obtained with a soluble transition metal compound, and by associating the third reaction product obtained with a catalyst-activating agent, such as trialkylaluminium. The catalyst composition described yields an LLDPE, among other substances, having a narrow molecular weight distribution when determined as a melt-flow ratio, which is the melt index ratio of a high and a low load. Comonomer distribution is only being mentioned by indicating that the LLDPE product obtained should contain a minimum amount of low-molecular and/or extremely branched polymer fraction soluble in hexane. The specification does not set out any correlation between the catalyst structure and the virtual comonomer distribution.

EP patent specification 435 557 sets forth an α-olefin, and specifically an LLDPE polymerization catalyst composition, prepared by contacting a magnesium compound with a titanium compound, by contacting the first reaction product obtained with a carrier, and by contacting the second reaction product obtained with dimethylaluminium chloride. The explicit purpose of this specification is to replace trialkylaluminium with an alkylaluminium chloride compound, for the catalyst to produce an LLDPE polymer that has a substantially more regular side branch distribution over the polymer molecules than do similar resins, produced with the same catalyst except for the use of trialkylaluminium.

U.S. Pat. No. 5,139,986 describes a catalyst composition for the preparation of polyethene, in particular LLDPE, prepared by contacting a magnesium compound with a transition metal compound, by activating the first reaction product obtained partly with dimethylaluminium chloride, trimethyl-aluminium or a mixture of these, and by eventually activating the second reaction product obtained with an organoaluminous compound. This catalyst composition specifically yields an LLDPE product with enhanced mechanical strength, enhanced bulk density, narrower molecular weight distribution and less soluble fraction.

EP patent specification 518 604 sets out a catalyst composition for HDPE and LLDPE preparation, prepared by impregnating an inorganic carrier containing hydroxyl with a dialkylmagnesium compound, by treating the impregnated product with a halogenous reagent, by treating the halogenated product with titanium tetrachloride and by associating the titanium product with triethylaluminium or diisobutylaluminium hydride, yielding polyethene with a molecular weight distribution of average width.

Only one of the specifications mentioned above focusses on enhancing the catalyst structure in order to obtain an LLDPE product having a more regular comonomer distribution over the macromolecules. This result is obtained by replacing conventional trialkylaluminium with alkylaluminium halogenide.

Though the references cited above aim to resolve the problem of irregular comonomer distribution in ethene copolymerization, the product still contains too great a fraction of very low-density and very high-density ethene copolymer, when alkylaluminium chloride is being used as a cocatalyst. Very low-density ethene copolymer (VLDPE) causes special problems, given that it softens the product and makes it difficult to handle. Consequently, the objective of the present invention is to provide an ethene and α-olefin copolymerization process and a catalyst composition which yield an optimally regular α-olefin distribution over the macro-molecules. At the same time, the invention aims at a process and a catalyst having optimal comonomer sensitivity, i.e. tendency to incorporate comonomer in the growing polyethene chain. The invention also aims at a process and a catalyst yielding an ethene copolymer having a molecular weight distribution, i.e. molar mass distribution as beneficial as possible to the mechanical properties of the product. A final objective of the invention is to provide an adequate hydrogen sensitivity, i.e. aptitude of the catalyst to react with hydrogen and to break the growing ethene copolymer chains in an appropriate manner.

The drawbacks listed above have now been eliminated and the objectives achieved with a new method for ethene and α-olefin copolymerization which is basically characterised by the features set out in the characterising clause of claim 1. In other words, it has now been found that in ethene and α-olefin copolymerization, comprising reaction between a procatalyst based on a halogen compound of a transition metal in any of groups 4 to 8 of the periodic table, a cocatalyst based on an organohalogenous compound of a metal in group 3 or 3 of the periodic table, ethene, and an α-olefin copolymerizing with ethene, preparation of the organohalogenous compound of a metal in group 2 or 3 of the periodic system by reacting the organic compound of a metal in group 2 or 3 and a catalytically non-toxic halogen compound during copolymerization, or not earlier than 3 hours before polymerization. This implies the discovery that when an organohalogenous compound is being used as a cocatalyst, the polymerization result will be different, provided that a fresh cocatalyst or even one prepared in situ is being used.

It is is particularly advantageous to prepare the organohalogenous compound of the metal in group 2 or 3 by reacting the organic compound of a metal in group 2 or 3 and the catalytically non-toxic halogen compound not earlier than 1 hour and preferably 30 minutes before starting the copolymerization.

In literature, the following reaction appears in Müller, K. H., *Ullmans Encyklopädie der technischen Chemie*, volume 7, page 347:

in which diethylaluminium chloride is prepared with a reaction between triethyl-aluminium and athylaluminium sesquichloride. The same reference defines the reaction

in which diethylaluminium chloride is prepared from triethyleluminium and ethylaluminium chloride. Other organohalogenous compounds of a metal in group 2 or 3 are also known, which are formed with a similar reaction between an organic compound of a metal and a catalytically non-toxic halogen compound. The catalytic behaviour of a fresh reaction mixture being different from that of an ageing reaction mixture, the reason must be that the final product is so slowly generated that an intermediate product of the generating reaction acts as a catalyst. In the present invention, this catalytic difference is particularly noticeable in that, when determined with a TREF analyser, the ethene copolymer obtained has a more regular, i.e. better comonomer distribution over the macromolecules than in copolymerization using the final, i.e. an aged organohalogenous compound.

The procatalyst component in the process and the catalyst composition of the invention contains a halogen compound of a transition metal in any of groups 4 to 8 of the periodic table of elements. Preferred transition metals are elements in groups 4A, 5A, 6A, 7A and 8. Especially preferred transition metals are titanium Ti, zirkonium Zr, vanadium V, tantalum Ta, chromium Cr, molybdene Mo and cobolt Co. Especially preferred are $TiCl_4$, $TiCl_3$, $VCl_4$, $VCl_3$, $VOCl_3$, $MoCl_5$, $ZrCl_4$, $Cp_2TiCl_2$, $Cp_2ZrCl_2$ and $CoCl_2.2Py$. The most preferred transition metal halogen compounds are halogenides and alcoxy halogenides of titanium and vanadium. Alcoxy halogenides can be formed by reacting titanium tetraalcoxide with a compound that chlorinates it, such as an aluminous alkylchloride compound or similar. The most preferred are titanium halogenides and alcoxy halogenides, such as titanium trichloride and titanium tetrachloride mentioned above, and also metoxytitanium trichloride, butoxytitanium trichloride, phenoxytitanium trichloride, etc.

Transition metal halogen compounds to be especially recommended are chlorous tetravalent titanium compounds of formula (1)

$$(RO)_n TiCl_{4-n} \qquad (1)$$

in which n is 0, 1, 2 or 3, and R is a hydrocarbon group, preferably alkyl, and most preferably $C_1$–$C_4$-alkyl.

Besides the transition metal halogen compound, the procatalyst used in the process and catalyst composition of the invention may contain magnesium compounds promoting catalytic activity (cf. prior art description above), among which magnesium dihalogenides, especially magnesium dichloride are particularly advantageous.

The procatalyst may also contain an "internal donor" to promote polymerization. Such internal donors are for instance alkyl esters of aliphatic and aromatic carboxylic acids, aliphatic ethers, including cyclic ethers, aliphatic ketones and aliphatic alcohols. Internal donors are well known in the profession, and the choice of such donors is not crucial for this invention.

In one preferred embodiment of the invention, the procatalyst component comprises magnesium dichloride and titanium tetrachloride, most preferably with titanium tetrachloride and magnesium chloride deposited on a solid carrier agent, preferably on an inorganic oxide carrier and most preferably on silica, i.e. silicon dioxide.

As stated above, the cocatalyst of the process and the catalyst composition of the invention comprises an organohalogenous compound of a metal in group 2 or 3, prepared by reacting an organic compound of a metal in group 2 or 3 and a catalytically non-toxic halogen compound either during the very copolymerization or not earlier than three hours before polymerization. The organohalogenous compound of the metal in group 2 or 3 must be fresh in order to yield an α-olefinmer distribution as regular as possible for the ethene and α-olefin copolymer. The second reactant, that is an organic compound of a metal in any of groups 1 to 3, is the compound of formula (2) in a preferred embodiment of the invention $$R_n M \qquad (2)$$

in which R is $C_1$–$C_{12}$-alkyl, M is a metal in any of groups 1 to 3, and n is the valence of the metal. Typical metals in group 2 or 3 are aluminium and zinc, aluminium being preferred. Preferred organic compounds of aluminium are tri-$C_1$–$C_{10}$-alkylaluminiums, preferably tri-$C_1$–$C_5$-alkylaluminiums and most preferred is triethylaluminium TEA.

In the method of the invention, the organic compound of a metal in group 2 or 3 is reacted with a catalytically non-toxic halogen compound either in situ during copolymerization, or not earlier than 3 hours before polymerization. The catalytically non-toxic halogen compound may consist of any halogenating compound or a blend which does not poison the procatalyst and thus is appropriate in the sense of the invention. Among halogenating reagents we may cite halogens $Cl_2$, $Br_2$ and $I_2$, carbon tetrachloride $CCl_4$, silicon tetrachloride $SiCl_4$ and chlorous metal compounds. In a preferred embodiment of the invention, the catalytically non-toxic halogen compound is a compound of formula (3).

$$R'pMqX(qn-p) \qquad (3)$$

in which R' is $C_1$–$C_{12}$-alkyl, M is a metal in any of groups 1 to 3, X is halogen, p is an integral number between 1 and (q·n-2), q is 1 or 2, and n is the valence of metal. It is particularly advantageous if the compound of formula (3) is alkyl-aluminium halogenide, preferably ethylaluminium dichloride, a mixture of ethylaluminium dichloride and diethylaluminium chloride, ethylaluminium sesquichloride, methylaluminium dichloride, a mixture of methylaluminium dichloride and dimethylaluminium chloride, or methylaluminium sesquichloride. The most preferred alkylaluminium halogenide is ethylaluminium sesquichloride. When an organometallic compound of formula (2) is reacted with a halogen compound of formula (3), the organic groups and metals should preferably be of the same quality, preferably ethyl and aluminium respectively.

Cocatalyst reactants are preferably introduced in an amount such that the ratio of cocatalyst to procatalyst calculated as a molar ratio M/Ti is approx. 5 to 200, preferably approx. 10 to 50. When the organohalogenous compound of a metal is being prepared for the cocatalyst, the catalytically non-toxic halogen compound and the organic compound of a metal in group 2 or 3 is preferably introduced in a molar ratio in the range of approx. 0.1 to 2 and most preferably approx. 1.

A study of the process of the present invention shows that the components to be introduced in the polymerization composition or contacted with it are a procatalyst, ethene, an α-olefin copolymerizing with ethene, an organic compound of a metal in any of groups 1 to 3, and a catalytically non-toxic halogen compound. The mixture may naturally also contain intermediate agents and other agents acting on polymerization. These components may be introduced in any order, provided that the organic compound of the metal in group 2 or 3 and the catalytically non-toxic halogen compound are contacted either during copolymerization, or not earlier than 3 hours before it. The reaction may be conducted by contacting the procatalyst and the organic compound of the metal in group 2 or 3 and by subsequently introducing the catalytically non-toxic halogen compound into the reaction mixture formed by these, or optionally by contacting the organic compound of the metal in group 2 or 3 and the catalytically non-toxic halogen compound, and by eventually contacting their reaction mixture with the procatalyst and the monomers. All the same, the process of the invention comprises two chief embodiments.

In the first chief embodiment, the organohalogenous compound of a metal in group 2 or 3 is first prepared from an organic compound of the metal concerned and a non-toxic halogen compound, and subsequently they are reacted within 3 hours with the procatalyst, ethene and a copolymerizing α-olefin. This process yields a fresh cocatalyst, which subsequently reacts with the procatalyst and the monomers, forming an ethene copolymer having a particularly advantageous α-olefinmer distribution. As indicated above, it is particularly advantageous if the fresh organohalogenous compound is reacted with the procatalyst, ethene and α-olefin within 1 hour, and more preferably within 30 minutes. In one embodiment, the organohalogenous compound of the metal concerned is prepared by heating an organic compound of a metal in group 2 or 3 and a catalytically non-toxic halogen compound jointly, the reaction mixture obtained, preferably warm and fresh from the oven, being subsequently reacted with a procatalyst, ethene and α-olefin.

In the second chief embodiment of the invention, the fresh cocatalyst is prepared in situ during copolymerization. In this case, it is preferable that the procatalyst and the organic compound of a metal in group 2 or 3 are first contacted, and the mixture or product obtained is subsequently reacted with a catalytically non-toxic halogen compound, and within 3 hours it is further copolymerized with ethene and α-olefin.

The process of the invention may use any α-olefin copolymerizing with ethene. However, preferred α-olefins are such α-olefins that together with ethene, especially in small amounts, form linear low-density polyethene "LLDPE". Those skilled in the art know quite well which α-olefins are relevant for this purpose.

Examples of useful α-olefins are propylene, 1-butene, 1-pentene, 1-hexene, 1-octene, etc., cyclo-olefins such as cyclobutene, cyclopentene, cyclohexene and norbornene, branched α-olefins such as 3-methyl-1-pentene(Y-M-I-P), 4-methyl-1-hexene, 5-methyl-1-heptene, 3-methyl-1-butene, 4-phenyl-1-hexene, etc.

Particularly good results are achieved when $C_4$–$C_{10}$-1-alkene, e.g. 1-hexene, is used as an α-olefin copolymerizing with ethene.

The process of the invention may implement any process for ethene copolymerization using the Ziegler-Natta system. Slurry and gaseous phase processes are most preferred. As stated above, hydrogen usually acts as a chain transfer reagent. The processes may adopt any suitable temperatures, e.g. in the range of approx. 30 to 115° C. The period of contacting the organic compound of a metal in group 2 or 3 with a catalytically non-toxic halogen compound may vary greatly, provided that the contacting time before polymerization does not exceed the 3 hours mentioned above.

As initially mentioned, the invention also relates to catalyst compositions for the polymerization of olefinic compounds, comprising at least the following components:

a) a procatalyst comprising a halogen compound of a transition metal in any of groups 4 to 8 of the periodic table of elements, b) a cocatalyst comprising an organohalgenous compound of a metal in group 2 or 3 of the periodic table of elements, and characterised by the organohalogenous compound of a metal being prepared by reacting the organic compound of a metal in group 2 or 3 and a catalytically non-toxic halogen compound during polymerization, or not earlier than 3 hours before polymerization.

Since it has been experimentally confirmed that a fresh cocatalyst prepared as described above acts in a different way than an ageing cocatalyst prepared from the same reactants, it is evident that we now have a new catalyst with a different structure, which additionally has an essentially different effect on the polymerization of olefinic compounds.

Though we have no positive information on the structure of the new cocatalyst, we may assume that the reaction between the organic compound of a metal and the catalytically non-toxic halogen compound generates long-lasting excited states and/or intermediate products, having a basically different catalytic action than an aged end product, as described above.

It is particularly advantageous if the halogen compound of a metal in group 2 or 3 in the catalytic composition of the invention is prepared by reacting the organic compound of a metal in group 2 or 3 and a catalytically non-toxic halogen compound not earlier than 1 hour and preferably about 30 minutes before polymerization is started.

The other features of the catalyst composition of the invention appear from the process description provided above.

A number of embodiment and comparative examples will be given below with the sole purpose to illustrate the invention.

EXAMPLES

Examples 1 to 5

The copolymerization runs were conducted by using a procatalyst supported on silica, prepared in the manner set out in FI lay-out print 89500, enclosed as a reference. The active transition metal compound consisted of a reaction product of titanium tetraalcoxide and an aluminium alkyl chloride chlorinating this. The reactor was a 2l slurry reactor of Büchi type. The reference polymerization runs, i.e. example 1 (comparison) and example 2 (comparison) were conducted by using triethylaluminium TEA and diethylaluminium chloride DEAC respectively as cocatalysts. All the polymerization runs were conducted in the same way.

Polymerization Conditions
  procatalyst: cf.above, 60 mg
  comonomer: 1-hexene, 150 ml
  medium: isobutane
  chain transfer agent: hydrogen, 8 bar/330 ml
  temperature: 85° C.
  total pressure: 19 bar In all the examples, the molar ratio of the catalytically non-toxic halogen compound to the organic compound of a metal in group 2 or 3, i.e. to the triethyl aluminium used, was 1:1. In the embodiment examples of the invention, examples 4 and 5, the catalytically non-toxic halogen compound used was ethylaluminium sesquichloride EASC and ethylaluminium dichloride EADC respectively. After the reaction between the organic compound and the halogen compound, the overall molar ratio Al/Ti of the entire catalytic system was 50.

To ensure that the desired reactions took place on the procatalyst surface, and not before triethylaluminium joined the procatalyst, the tests were conducted in a system provided with double feed flasks. The procatalytically non-toxic halogen compound was fed from the first cylinder to the reactor before heating. The procatalyst and the triethylaluminium were precontacted in the second flask during heating of the reactor for about 1 hour. The catalyst and the triethyl aluminium were introduced in the reactor at a temperature of 85° C.

The polymerization results obtained with the use of the procatalyst described above are given in table 1.

TABLE 1

| Example | Ref. 1 | Ref 2 | Ref. 3 | Example 4 | Example 5 |
|---|---|---|---|---|---|
| A-alkyl | TEA | DEAC | EASC | TEA | TEA |
| Halogen compound | — | — | — | EASC | EADC |
| Activity kg PE/g cat. | 3.4 | 2.3 | 0 | 2.0 | 2.2 |
| Density | 939 | 922 | | 928 | 927 |
| Comonomer content | 5.8% by weight | 8.6% by weight | | 5.5% by weight | 6.5% by weight |
| $CH_3$/1000 C. | 10.3 | 15.2 | | 9.8 | 11.5 |
| $MFR_2$ | 9.5 | 0.65 | | 0.45 | 0.73 |
| $MFR_{21}$ | *) | 22.9 | | 13.7 | 24.0 |
| $FRR_{21/2}$ | | 35.2 | | 30.4 | 32.9 |
| TREF, HD surface | 33.5% | 31.4% | | 17.2% | 27.8% |
| DSC, sp. | 125.7° C. | 124.4° C. | | 124.3° C. | 124.3° C. |
| DSC, crystal | 52.8% | 44.9% | | 44.7% | 44.4% |

*)impossible to determine with a melt index of that order

Table 1 clearly shows how the fresh reaction products of triethylaluminium and ethylaluminium sesquichloride, and ethylaluminium dichloride, respectively, have affected the polymer properties as compared to procatalysts, in which triethylaluminium, diethylaluminium chloride or ethylaluminium sesquichloride alone have been used. It is worth noting that the diethylaluminium chloride used in comparative example 2 actually is the final, i.e. old reaction product of triethylaluminium and ethylaluminium sesquichloride and ethylaluminium dichloride respectively. When the catalytically non-toxic halogen compound consisted of EASC or EADC in conformity with the invention, ethene copolymer densities were closer to those of a copolymer obtained with DEAC than the density of a copolymer obtained with TEA. This is due to partial chlorination of TEA in the in situ process of the invention.

Activities and melt flow, $MFR_2$ values are also closer to the comparative test carried out with DEAC.

A surprising finding is the comonomer content of polymers prepared according to the invention as a function of density. The values are not explained merely by the conversion of TEA into DEAC. In fact, the tests clearly show that the comonomer distribution is more regular with TEA chlorinated in situ than with DEAC. A heat-fractioning TREF analysis with polymer obtained from fresh TEA+EASC product shows a relatively narrow peak in the LLDPE area, the peak being located at about 90° C. of the elution temperature (cf FIG. 1). The TREF curve also indicates that the polymer product contains no rubber-like fraction very rich in comonomer. This fraction appears in the comparative tests at an elution temperature of approx. 50° C. Also when dimethylaluminium chloride (DMAC) is being used as a cocatalyst fresh TEA+EASC product yields a more regular comonomer distribution than DMAC, cf. FIG. 2.

To ensure that EASC had not only superseded TEA as a cocatalyst, but also reacted with it, polymerization was performed also by using mere EASC as a cocatalyst (cf. 3, table 1). However, this reagent had no catalytic activity.

Examples 1 to 5 indicate that the comonomer, i.e. 1-hexene distribution over the various polymer molecules is more regular when a reaction product of triethylaluminium and ethylaluminium sesquchloride, prepared in situ or fresh, is being used, than with diethylaluminium chloride.

Examples 6–8

The copolymerization runs of these examples were conducted in a 2 l Büchi slurry reactor with the same procatalyst as in the preceding examples. All the polymerization runs were performed under the same circumstances and with the same TEA and EASC solution. The solution contained 1 mole/l of TEA and 1 mole/l of EASC.

Polymerization Conditions procatalyst: 60 mg ratio Al/Ti: 50 comonomer: 1-hexene, 200 ml medium: isobtuane, 800 ml chain transfer: hydrogen, 9 bar/330 ml temperature: 85°C.

total pressure: 19 bar

A double flask was used for feeding. The TEA and EASC solution was first introduced in the reactor at a temperature of 20° C. and the procatalyst was subsequently introduced in the reactor, heated to a temperature of 85° C.

The first polymerization run, i.e. embodiment example 6, was undertaken as soon as possible after TEA and EASC had been admixed. The polymerization was thus started 30 minutes after admixing and heating had been started. Comparative example 7 was conducted by starting polymerization after a 24-hour agitation, and comparative example 8 was conducted by starting polymerization one week after the agitation. During the one week, the TEA and EASC solution, that is to say the solution of the reaction product formed by these, was kept in a nitrogen-protected vessel. The results are given in table 2.

TABLE 2

| Example | Example 6 | Example 7 (comparison) | Example 8 (comparison) |
|---|---|---|---|
| Polymerization after agitation | 30 min. | 24 hours | 1 week |
| Activity kg PE/g cat | 2.19 | 1.49 | 1.84 |
| Density | 925.3 | 915.7 | 912.6 |
| Comonomer content | 7.9% by weight | 12.8% by weight | 14.2% by weight |
| $CH_3$/1000 C. | 14.0 | 22.3 | 24.6 |
| $MFR_2$ | 2.06 | 2.55 | 2.02 |
| $MFR_{21}$ | 61.94 | 88.41 | 82.55 |
| $FRR_{21/2}$ | 30.1 | 34.7 | 40.9 |
| TREF, VLD/LLD/HD surfaces | 24.8/56.2/18.1% | 37.1/40.1/22.5% | 41.4/38.0/19.8% |
| DSC sp. | 124.4° C. | 123.7° C. | 123.8° C. |
| DSC, crystal | 42.8% | 37.1% | 36.2% |

Generally speaking, the comonomer content increases with an older TEA-EASC product, whereas melt flow values $MFR_2$ remain roughly the same. The melt index ratio shows that the molecular weight distribution has become broader.

Figure 3A:
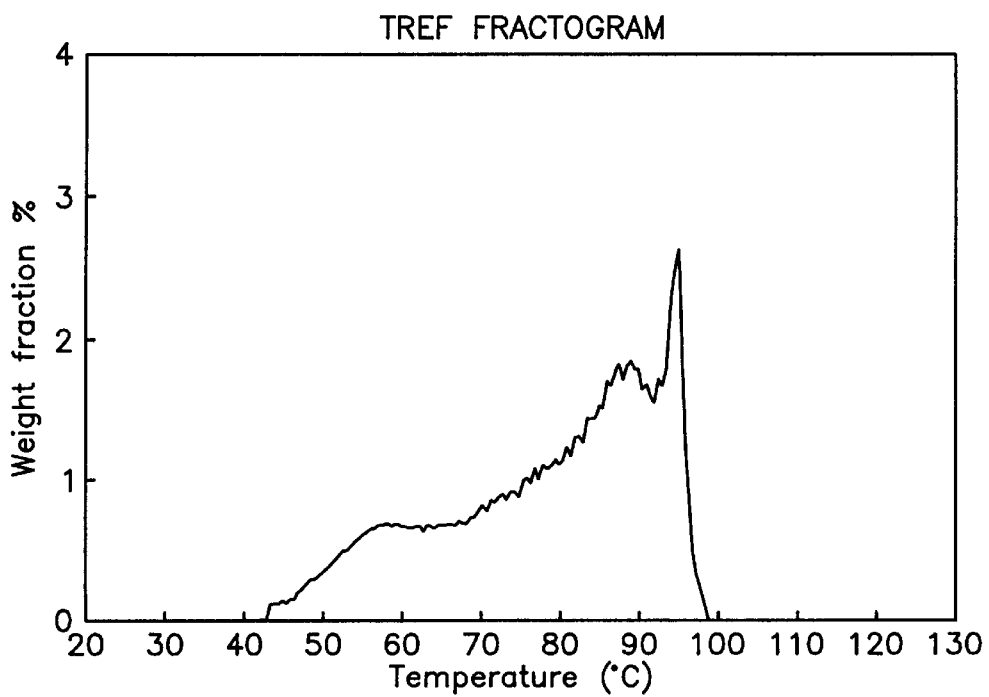
Figure 3B:
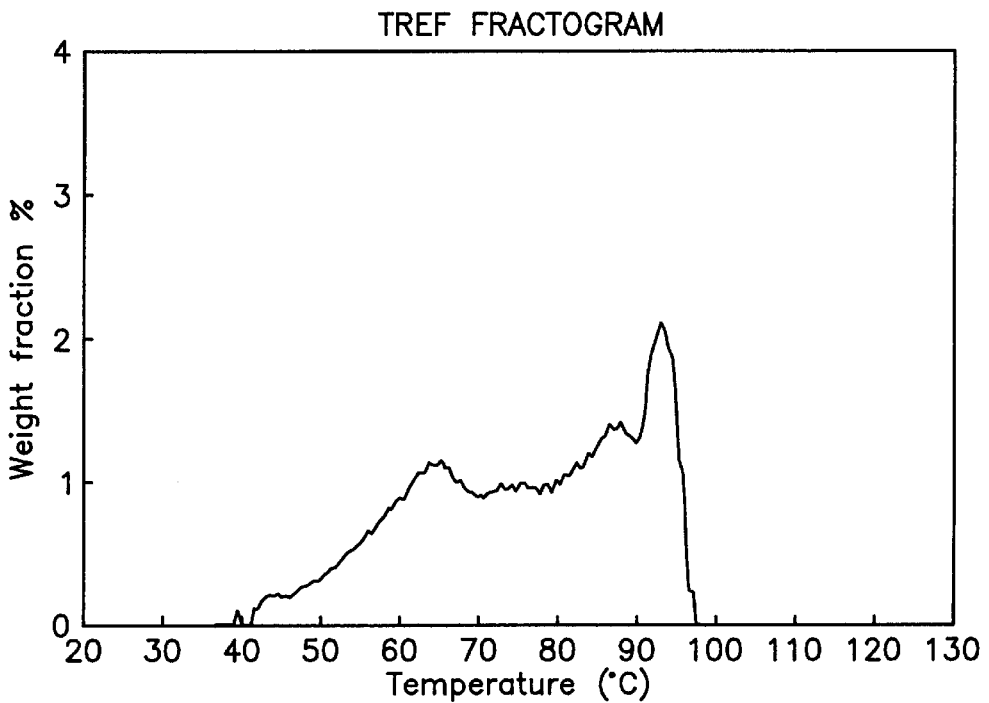
Figure 3C:
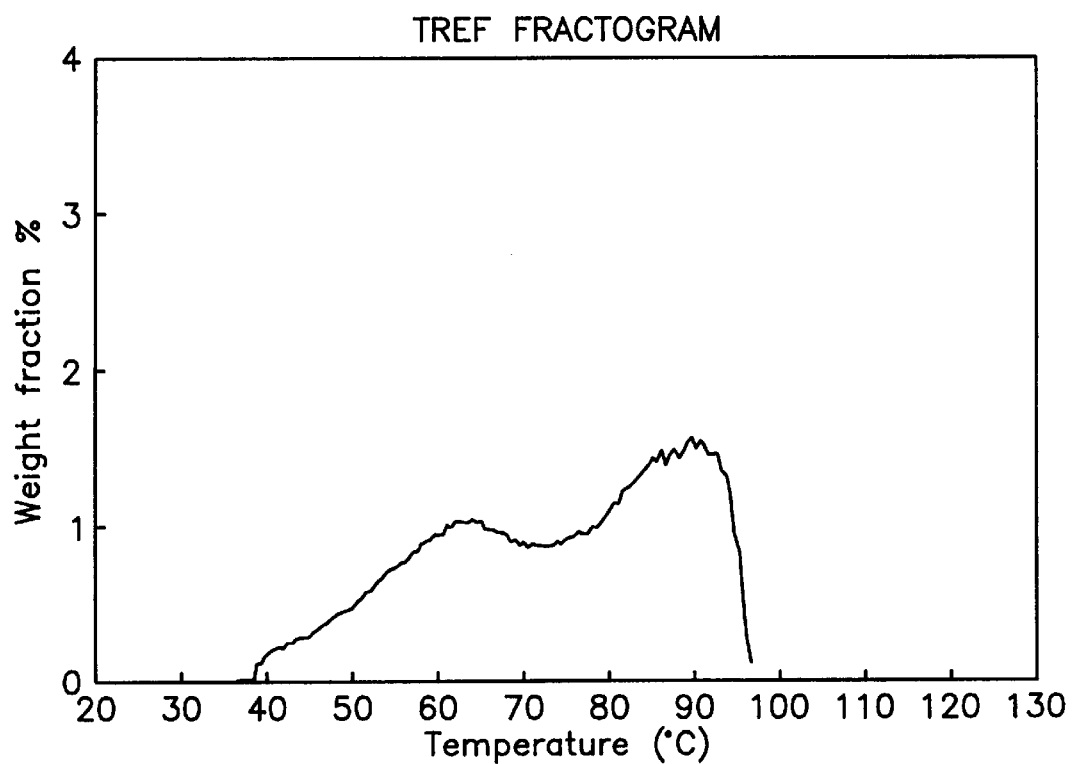
Figure 4:
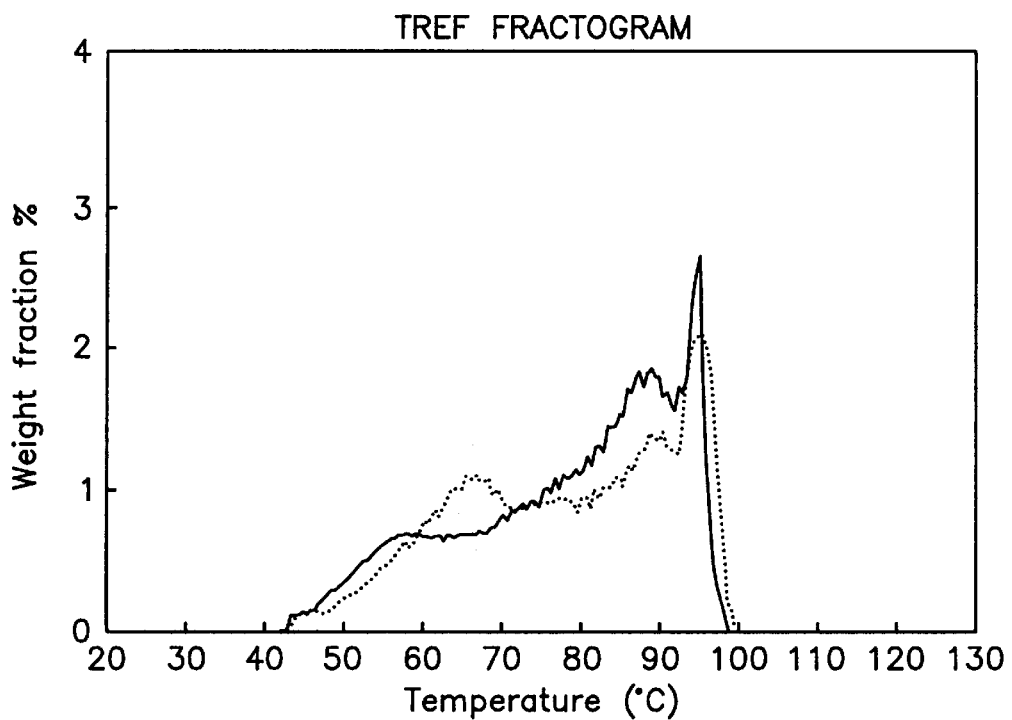

The heat-fractioning TREF analysis, illustrated in FIGS. 3 and 4, indicates appreciable differences in the comonomer distribution. A fresh solution yielded the highest and the narrowest peak in the area of a linear low-density polyethene fraction. As a matter of time, the proportion of detrimental, very low-density polyethene fraction will grow, the growth also appearing as a lower average density of the polymer product. This copolymer portion is apparently sticky and causes problems in the process. What is more, this fraction affects the mechanical properties of the end products.

Figure 5:
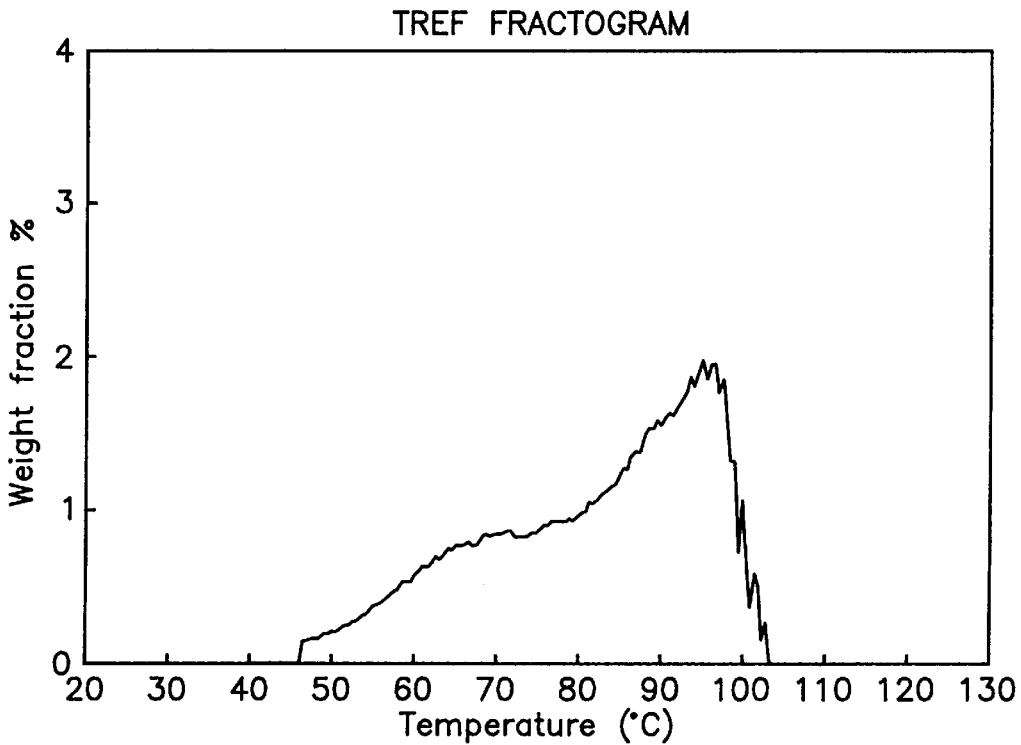

We note that in comparative example 8, using an old TEA-EASC reaction product, the TREF curve (FIG. 3, lowermost curve) reminds of the TREF curve with diethylaluminium chloride, DEAC, as a cocatalyst (cf. FIG. 5).

Embodiment example 6 and comparative examples 7 and 8 clearly indicate that ageing of the TEA-EASC reaction product has a distinct effect on the comonomer distribution of the polymer. The results lead to the conclusion that a fresh TEA-EASC solution has a different chemical composition than an aged reaction mixture, this chemical difference resulting in a more regular ethene copolymer comonomer distribution.

Example 9, 10 and 11

These examples analysed the impact of the feed order and the feed temperature on the results of the process of the invention. All the polymerization runs were performed under standard circumstances in a 2 l slurry reactor of Büchi type with the same procatalyst as in the preceding examples.

Polymerization Conditions procatalyst: the same as above in example 4, 60 mg

TEA/EASC: 1:1

Al (coc.)/Ti: 50 comonomer: 1-hexene, 150 ml medium: isobutane, 850 ml chain transfer: 8 bar/330 ml temperature: 85° C.

total pressure: 19 bar

The feed equipment consisted of a double feed flask system, comprising one cylinder on top of another. First, the first cylinder was emptied into the reactor, and subsequently the second cylinder was emptied into the reactor through the first cylinder. The following feed systems were adopted in the embodiment examples:

Example 9

EASC in the first cylinder, feed at a temperature of 20° C., Procatalyst+TEA in the second cylinder, feed at a temperature of 85° C.

Example 10

TEA+EASC in the first cylinder, feed at a temperature of 20° C. Procatalyst in the second cylinder, feed at a temperature of 85° C.

Example 11

TEA+EASC in the first cylinder, feed at a temperature of 85° C. Procatalyst in the second cylinder, feed at a temperature of 85° C.

The cylinders were not heatable, and heating of the reactor lasted about 30 min. The cylinders had to be filled and connected to the reactor before heating. In example 9, the precontacting time between procatalyst and TEA stayed about 30 minutes at room temperature, whereas in example 10, the TEA-EASC mixture was in the reactor for about 30 minutes, heated at a temperature of 20° C. to a final temperature 85° C. In example 11, the TEA-EASC reaction mixture was kept at room temperature for 30 minutes, and was introduced into the reactor at a temperature of 85° C.

The results are given in table 3.

TABLE 3

| Test | Example 9 | Example 10 | Example 11 |
|---|---|---|---|
| Feed cylinder A | EASC fed at a temp. of 20° C. | TEA + EASC fed at a temp. of 20° C. | TEA + EASC fed at a temp. of 85° C. |
| Feed cylinder B | procatalyst + TEA fed at 85° C. | procatalyst fed at 85° C. | procatalyst fed at 85° C. |
| Activity kg PE/g cat. | 2.0 | 2.2 | 1.6 |
| Density | 928 | 933 | 933 |
| Comonomer content | 5.5% by weight | 4.0% by weight | 3.4% by weight |
| $CH_3/1000$ C. | 9.8 | 7.3 | 6.3 |
| $MFR_2$ | 0.45 | 0.84 | 0.49 |
| $MFR_{21}$ | 13.7 | 26.1 | 15.0 |
| $FRR_{21/2}$ | 30.4 | 31.1 | 30.6 |
| DSC, sp. | 124.3° C. | 125.1° C. | 125.1° C. |
| DSC, crystal | 44.7% | 49.3% | 49.8% |

As shown in table 3, the results were very similar. The TREF curves did not allow calculation of the numeric proportions of the various fractions, still, the curves varied greatly (cf. FIGS. 6 and 7). The figures show a very narrow distribution for examples 10 and 11, so that detrimental low-density fraction does not occur in any polymer obtained in the test. Apparently precontacted TEA+EASC yields a very homogenous polyethene product of LLDPE and HDPE, whereas precontacted procatalyst and TEA, brought into contact with EASC only in the polymer vessel, produces a greater amount of LLDPE fraction.

On the other hand, it seems that the feed order and feed temperatures do not have a crucial impact on the melt index ratio $FRR_{21/2}$.

Examples 12 to 14

The invention also involved study of a second procatalyst, prepared as defined in U.S. Pat. No. 4,395,359, enclosed as a reference. In this case, silica was used as a carrier, and $TiCl_4$ as an active transition metal compound. The tests were conducted with the combination TEA+EASC, and with mere TEA in reference test 11.

Copolymerization Conditions procatalyst: see above, 100 mg comonomer: 1-hexene, 300 ml medium: isobutane, 700 ml chain transfer: hydrogen, 9.2 bar/330 ml temperature: 85° C.

total pressure: 19 bar

The tests made use of the same feed cylinder as the preceding examples. The feed systems and feed temperatures were as follows:

Example 12 (Comparative Example)

TEA in the first cylinder, feed at a temperature of 20° C. Procatalyst in the second cylinder, feed at a temperature of 85° C.

Example 13

TEA+EASC in the first cylinder, feed at a temperature of 20° C. Procatalyst in the second cylinder, feed at a temperature of 85° C.

Example 14

TEA+EASC in the first cylinder, feed at a temperature of 85° C. Procatalyst in the second cylinder, feed at a temperature of 85° C.

The copolymerization results are given in table 4.

TABLE 4

| Test | Example 12 (comp.) | Example 13 | Example 14 |
|---|---|---|---|
| Feed cylinder A | TEA fed at 20° C. | TEA + EASC fed at 20° C. | TEA + EASC fed at 85° C. |
| Feed cylinder B | procatalyst fed at 85° C. | procatalyst fed at 85° C. | procatalyst fed at 85° C. |
| Activity kg PE/g cat. | 1.91 | 0.78 | 0.62 |
| Density | 921.5 | 925.7 | 924.2 |
| Comonomer content | 10.0% by weight | 6.9% by weight | 7.9% by weight |
| $CH_3/1000$ C. | 17.5 | 12.2 | 13.9 |
| $MFR_2$ | 4.86 | 0.96 | 1.02 |
| $MFR_{21}$ | 136.6 | 24.18 | 45.03 |
| $FRR_{21/2}$ | 28.1 | 25.2 | 44.1 |
| TREF, VLD/LLD/ | 38.5/40.1/ | 28.2/44.8/ | 30.3/38.2/ |
| HD surfaces | 21.1% | 25.6% | 30.4% |
| DSC. sp. | 123.6° C. | 124.4° C. | 124.4° C. |
| DSC, crystal | 40.8% | 43.9% | 44.6% |

When the procatalyst of the U.S. patent specification was used under the same circumstances, in situ chlorination did not drop density as much as did the catalyst of the FI patent specification (from 939 to 928).

Yet the comonomer distribution was different with EASC as a catalyst, cf. FIG. 8. The enhanced distribution was most distinct for the low-temperature, i-e. very low-density polyethene fraction in the TREF fractogram. This caused a slight increase in average density.

Tests carried out with the second procatalyst of the U.S. patent specification indicate that preparing the cocatalyst in situ or just before polymerization has a favourable impact on the comonomer distribution, regardless of the type of procatalyst used. The main thing is apparently that the procatalyst and the cocatalyst are based on metal compounds having a polymerizing activity typical for Ziegler-Natta systems.

The examples refer to FIGS. 1 to 8, of which

Figure 2:
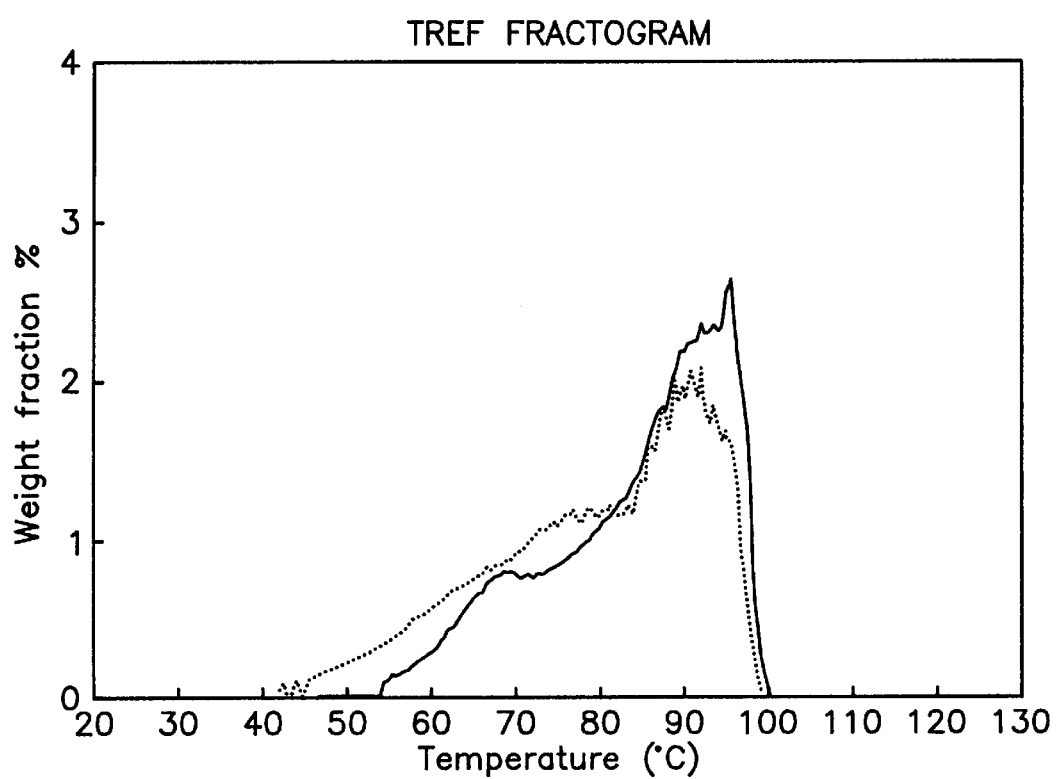
Figure 6C:
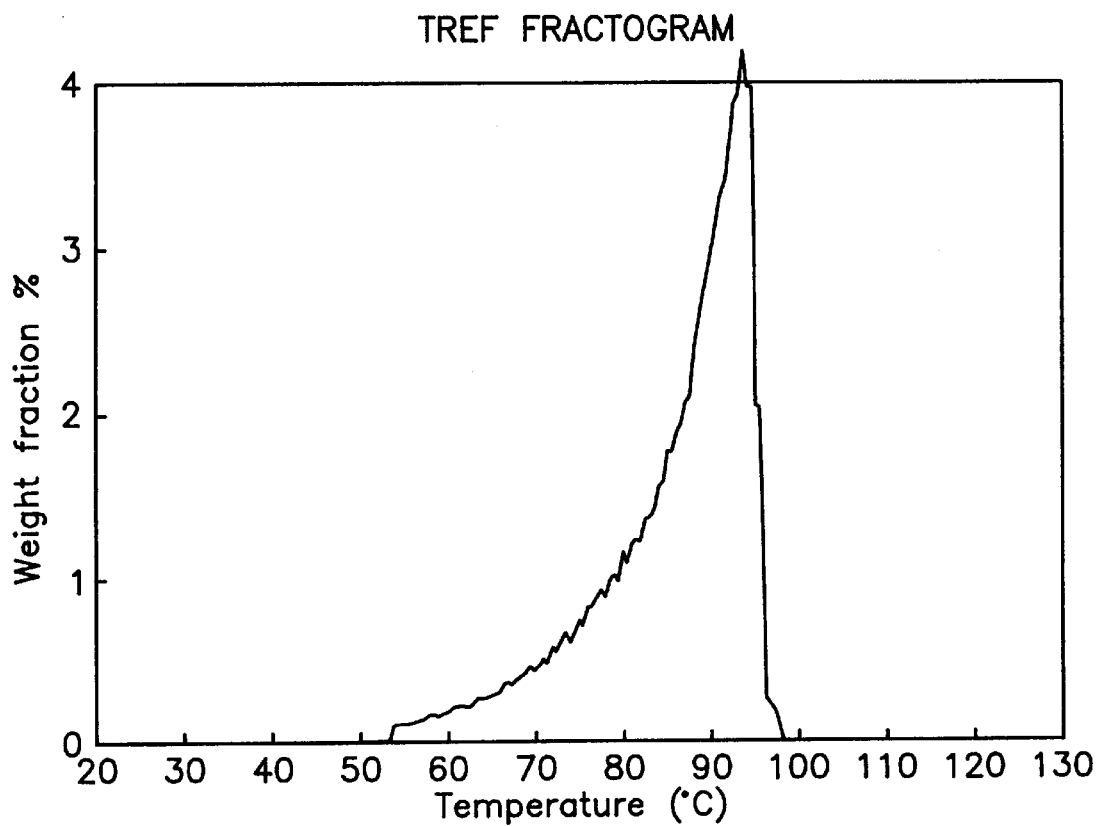
Figure 7:
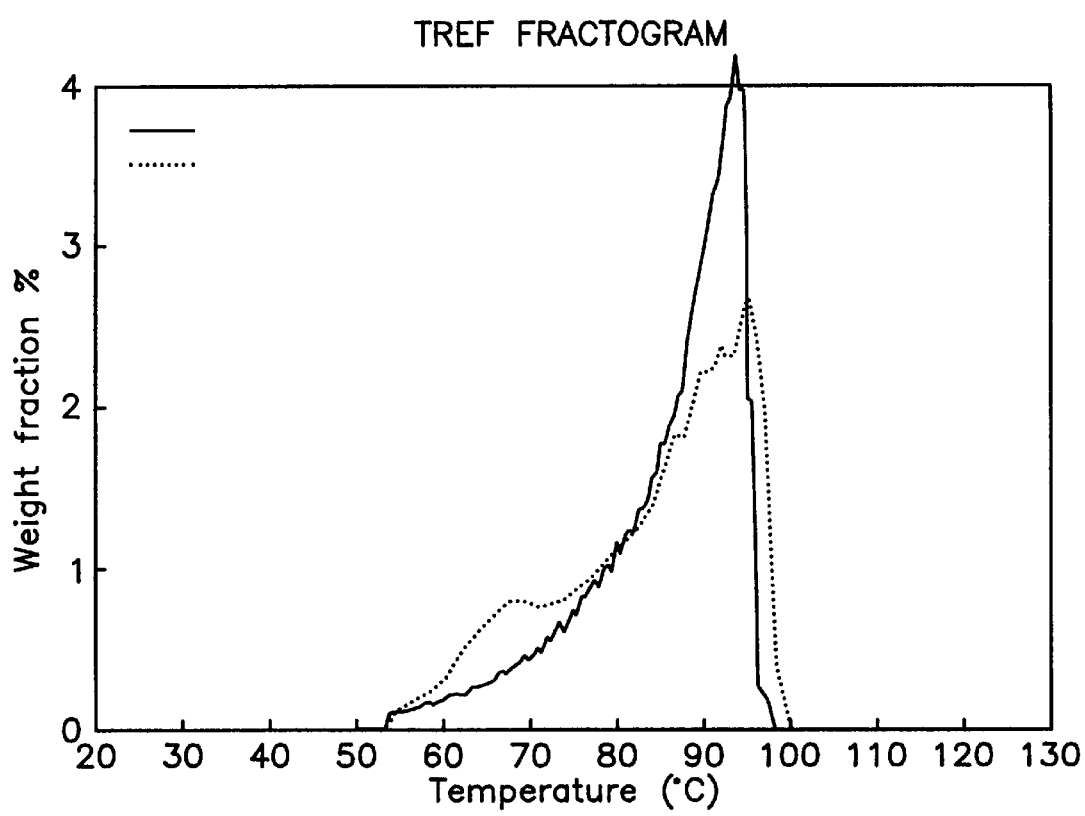
Figure 8C:
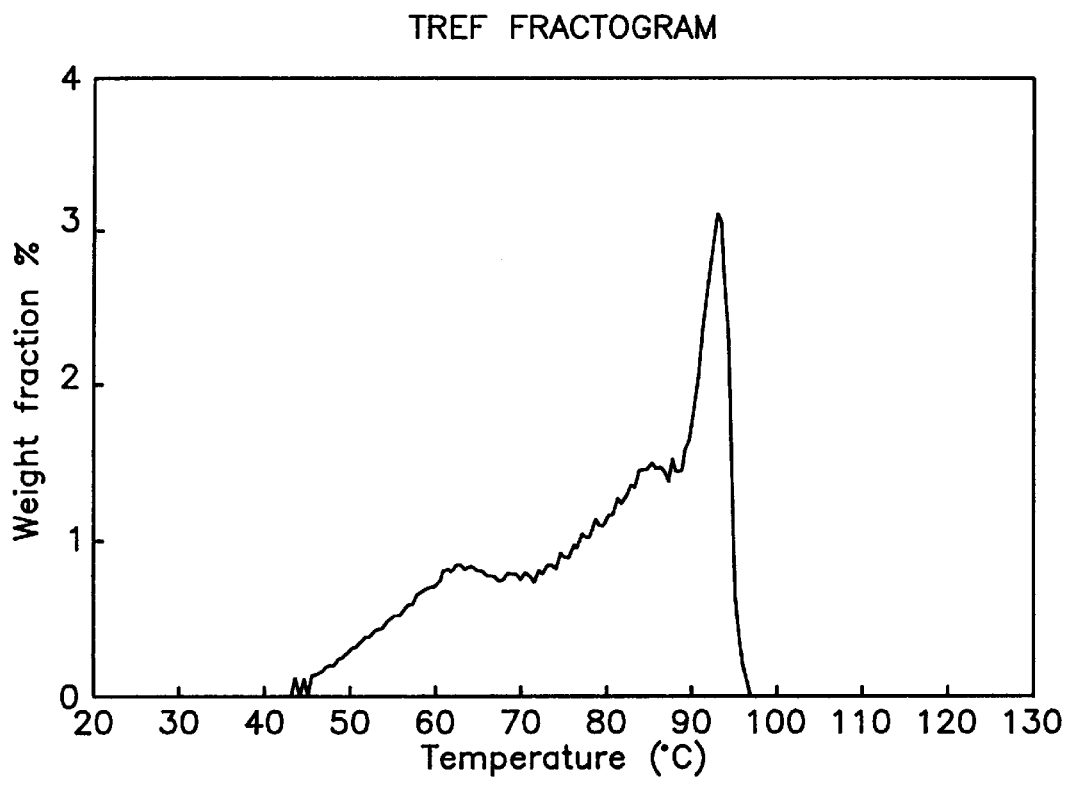

FIG. 1A to FIG. 1D illustrates TREF curves for ethene/1-hexene copolymers when theprocatalyst of FI patent specification 89500 is used along with TEA (example 1, comparison), DEAC (example 2, comparison) TEA+EASC prepared in situ (example 4, invention) and TEA+EADC prepared in situ (example 5, invention), FIG. 2 illustrates a TREF curve for ethene/1-hexene copolymer when the procatalyst of FI patent specification 89500 is used along with TEA+EASC product prepared in situ (example 4) and on the other hand, the procatalyst together with dimethylaluminium chloride: TREF curves with the procatalyst of FI patent specification 89500 and a TEA+EASC cocatalyst prepared in situ (full line) as compared to a polymer prepared with the same DMAC procatalyst (dotted line), FIG. 3A to FIG. 3C illustrates TREF curves for ethene/1-hexene copolymers in examples 6, 7 and 8, polymerization having been started 30 minutes (uppermost curve), 1 day (central curve) and 1 week (lowermost curve) after TEA has been contacted with EASC to form a cocatalyst, FIG. 4 illustrates the TREF curves of the polymers of example 6 (polymerized after 30 minutes, full line) and example 7 (polymerized after 24 hours, dotted line) on top of each other, FIG. 5 illustrates the TREF curve of ethene/1-hexene copolymer with the procatalyst of FI patent specification 89500 as a procatalyst and pure DEAC as a cocatalyst, the density being 923, MFR$_2$ 0.9 and FRR$_{21/2}$ 29.5, see examples 6 to 8, FIGS. 6A to 6C illustrates the TREF curve of ethene/1-hexene copolymer with the procatalyst of FI patent specification 89500 as a procatalyst and in situ or quite fresh TEA and EASC reaction product as a cocatalyst, the uppermost curve showing the situation of example 9, in which EASC was separately fed at a temperature of 20° C. and TEA+procatalyst were separately fed together at a temperature of 85° C., the central curve shows the situation of example 9, in which TEA+EASC were fed together at a temperature of 20° C. and the procatalyst separately from these at a temperature of 85° C., and the lowermost curve shows the situation of example 11, in which TEA and EASC were fed together at a temperature of 85° C. and the procatalyst separately from these at a temperature of 85° C., FIG. 7 shows the TREF curves of the ethene/1-hexene copolymers in examples 4 and 10 on top of each other, and f FIGS. 8A to 8C illustrates the TREF curves of ethene/1-hexene copolymer with the catalyst of examples 12 to 14 (U.S. Pat. No. 4,395,359) as a procatalyst the uppermost curve showing the situation of example 11 (comparison), in which TEA was fed as the only cocatalyst at a temperature of 20° C., and the procatalyst separately from this at a temperature of 85° C., the central curve showing the situation of example 13 (the invention), in which TEA+EASC were fed together at a temperature of 20° C. and the procatalyst separately at a temperature of 85° C., and the lowermost curve showing the situation of example 14 (the invention), in which TEA+EASC were fed at a temperature of 85° C. and the procatalyst separately at a temperature of 85° C.

What is claimed is:

1. A process for copolymerizing ethene and C$_4$–C$_{10}$-1-alkene into linear low density polyethylene (LLDPE) having a more regular C$_4$–C$_{10}$-1-alkene distribution over the macromolecules, consisting essentially of reacting the following components with each other:

a) a procatalyst consisting essentially of a chlorine compound of titanium having the formula (1)

$$(RO)_n TiCl_{4-n} \tag{1}$$

wherein R is a hydrocarbyl group and n is 0, 1, 2, or 3, optionally an inorganic oxide carrier, and optionally a magnesium dihalide, b) an organoaluminum compound having the formula (2)

$$R'_3 Al \tag{2}$$

wherein R' is a C$_1$–C$_{12}$ alkyl group, c) a chlorinating, catalytically non-toxic chlorine compound having the formula (3)

$$R''_p Al_q Cl_{(3q-p)} \tag{3}$$

wherein R" is a C$_1$–C$_{12}$ alkyl group, p is an integer between 1 and (3q-2), and q is 1 or 2, d) ethene, e) one or more C$_4$–C$_{10}$-1-alkene copolymerizing with ethene, and f) optionally hydrogen as a chain transfer agent, wherein the order of contacting components a), b) and c) is $$a)+[b)+c)] \text{ or } [a)+b)]+c)$$

and components b) and c) are contacted during the copolymerization or not earlier than 3 hours before copolymerization.

2. A process as claimed in claim 1, wherein said organoaluminum compound having the formula (2) and said chlorinating, catalytically non-toxic chlorine compound having the formula (3) are contacted not earlier than 1 hour before copolymerization is started.

3. A process as claimed in claim 2, wherein the organoaluminum compound b) and the chlorinating, catalytically non-toxic chlorine compound c) are contacted not earlier than 30 minutes before copolymerization is started.

4. A process as claimed in claim 1, wherein the molar ratio of the chlorinating, catalytically non-toxic chlorine compound c) to the organoaluminum compound b) is 0.1 to 2.

5. A process as claimed in claim 4, wherein the molar ratio of the chlorinating, catalytically non-toxic chlorine compound c) to the organoaluminum compound b) is about 1.

6. A process as claimed in claim 1, wherein the organoaluminum compound b) and the chlorinating, catalytically non-toxic chlorine compound c) are contacted first and a product is obtained, and the obtained product is subsequently reacted within 3 hours with the procatalyst a), the ethene d) and one or more C$_4$–C$_{10}$-1-alkene e).

7. A process as claimed in claim 6, wherein said obtained product is reacted within 1 hour with the procatalyst a), the ethene d) and one or more C$_4$–C$_{10}$-1-alkene e).

8. A process as claimed in claim 7, wherein said obtained product is reacted within 30 minutes with the procatalyst a), the ethene d) and one or more C$_4$–C$_{10}$-1-alkene e).

9. A process as claimed in claim 6, 7 or 8, wherein the organoaluminum compound b) and the chlorinating, catalytically non-toxic chlorine compound c) are heated together into a heated reaction mixture and the heated reaction mixture is reacted with the procatalyst a), the ethene d) and one or more C$_4$–C$_{10}$-1-alkene e).

10. A process as claimed in claim 1, wherein the copolymerization is conducted by first reacting the procatalyst a) with the organoaluminum compound b), subsequently reacting the mixture obtained with said chlorinating, catalytically non-toxic chlorine compound c), and eventually copolymerizing the ethene d) and one or more $C_4$–$C_{10}$-1-alkene e) with the reaction mixture obtained.

11. A process as claimed in claim 1, wherein R is an alkyl group.

12. A process as claimed in claim 1, wherein the procatalyst a) further comprises an inorganic oxide carrier.

13. A process as claimed in claim 1, wherein the organoaluminum compound b) is tri-$C_1$–$C_5$-alkylaluminium.

14. A process as claimed in claim 1, wherein the compound of formula (3) is ethylaluminium dichloride, a mixture of ethylaluminium dichloride and diethylaluminium chloride, ethylaluminium sesquichloride, methylaluminium dichloride, a mixture of methylaluminium dichloride and dimethylaluminium chloride, or methylaluminium sesquichloride.

15. A process as claimed in claim 14, wherein the compound of formula (3) is ethylaluminium sesquichloride.

16. A process as claimed in claim 11, wherein said one or more $C_4$–$C_{10}$-1-alkene is utilized in an amount of 3.4 to 8.6% by weight.

\* \* \* \* \*